(12) United States Patent
Penso

(10) Patent No.: US 11,625,318 B2
(45) Date of Patent: Apr. 11, 2023

(54) SYSTEM AND METHOD FOR IDENTIFYING SOFTWARE BEHAVIOR

(71) Applicant: Naor Penso, London (GB)

(72) Inventor: Naor Penso, London (GB)

( * ) Notice: Subject to any disclaimer, the term of this patent is extended or adjusted under 35 U.S.C. 154(b) by 0 days.

(21) Appl. No.: 17/329,237

(22) Filed: May 25, 2021

(65) Prior Publication Data

US 2022/0382666 A1    Dec. 1, 2022

(51) Int. Cl.
| | |
|---|---|
| *G06F 11/36* | (2006.01) |
| *G06F 11/34* | (2006.01) |
| *G06F 21/55* | (2013.01) |
| *G06F 8/60* | (2018.01) |

(52) U.S. Cl.
CPC ...... *G06F 11/3688* (2013.01); *G06F 11/3495* (2013.01); *G06F 8/60* (2013.01); *G06F 21/55* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,899,901 | B1 * | 3/2011 | Njemanze | G06F 21/552 709/224 |
| 8,549,173 | B1 * | 10/2013 | Wu | G06F 9/5016 709/238 |
| 9,479,518 | B1 * | 10/2016 | Fang | H04L 63/1425 |
| 10,672,470 | B1 * | 6/2020 | Thiruvengadam | G11C 29/56016 |
| 2003/0051026 | A1 * | 3/2003 | Carter | H04L 41/16 709/224 |
| 2007/0208538 | A1 * | 9/2007 | Gross | G06F 11/24 702/182 |
| 2017/0201606 | A1 * | 7/2017 | Ding | G06F 1/14 |
| 2019/0266502 | A1 * | 8/2019 | Moser | G06F 11/3447 |
| 2020/0126037 | A1 * | 4/2020 | Tatituri | G06N 20/10 |
| 2021/0049700 | A1 * | 2/2021 | Nguyen | G06N 3/08 |
| 2021/0373927 | A1 * | 12/2021 | Pillay | G06F 9/5077 |

OTHER PUBLICATIONS

Sugaya, "Lightweight Anomaly Detection System with HMM Resource Modeling", 2009, International Journal of Security and Its Applications vol. 3, No. 3, Jul. 2009 (Year: 2009).*

(Continued)

*Primary Examiner* — Hossain M Morshed
(74) *Attorney, Agent, or Firm* — Alphapatent Associates, Ltd; Daniel J. Swirsky

(57) ABSTRACT

A method including performing tests for a computer software that emulate user or application behavior when using the computer software, detecting a first set of resource properties when performing the tests on the computer software, identifying behavior patterns based on a series the event records created from the resource properties detected when running the tests, detecting a second set of properties of resources running the computer software following release of the computer software, comparing the behavior patterns extracted from the tests with a second behavior pattern extracted from real-life operation after release of the computer software, detecting normal software behavior and unnormal software behavior based on the differences between the behavior patterns extracted from the tests and second behavior pattern.

14 Claims, 3 Drawing Sheets

(56) References Cited

OTHER PUBLICATIONS

Ilgun, "State Transition Analysis: A Rule-Based Intrusion Detection Approach", 1995, IEEE Transactions On Software Engineering, vol. 21, No. 3, Mar. 1995 (Year: 1995).*

Sugaya, "Lightweight Anomaly Detection System with HMM Resource Modeling", 2009, International Journal of Security and Its Applications (Year: 2009).*

Huang, "Anomaly Detection by Monitoring Filesystem Activities", 2011, IEEE (Year: 2011).*

* cited by examiner

SYSTEM AND METHOD FOR IDENTIFYING SOFTWARE BEHAVIOR

FIELD

The invention, in some embodiments thereof, relates to methods for collecting software behavior and identifying behavior patterns.

BACKGROUND

Computer software is utilized on almost every electronic device. Some computer software is designed specifically to the electronic device, while other software, such as internet browsers or word processors, are more generic and can be used by multiple types of devices. The computer software is later installed and used on an electronic device, such as a personal computer, laptop, smartphone, tablet and the like. During operation, the software may receive information from the user of the electronic device, or from other entities, such as computer servers, sensors, and other devices. The software includes rules enabling the software to react to such input. The input may be part of normal behavior or unnormal behavior, as the behavior refers to the user or to the device sending information used by the software. Unnormal behavior may be associated with security breach, in which an attacker attacks the electronic device based on information to be used by the computer software.

The identification of anomalies in computer software is based on mathematical probabilities or software behavior analysis on running software following the release of the computer software. As such, anomality is identified in a general manner, which is not accurate for each software. In addition, it takes time, after the software is released and installed, to identify anomalies, and during this time, attackers can already attack the electronic device in which the software is installed, before the normal and unnormal behavior of the software are properly defined.

SUMMARY

The subject matter discloses a method and system for using software tests for generating deterministic patterns of computer software behavior, and enabling identification of anomalous behaviors during computer software runtime. The term deterministic differs from the probabilistic nature of prior art behavior analysis, which base on detection of the resources after release of the software. The subject matter discloses a method for creating a set of predetermined and patterns for defining the software behavior (otherwise a pattern must be based on probability).

In modern development environments, software developers are anticipated to validate the functionality written to the computer software is performing as expected through the creation of automated tests to evaluate the sanity of the written code. To that extent, a used pattern in software development called TDD (Test Driven Development) has emerged to help achieve the highest levels of functionality testing coverage within the computer software. Many organizations are leveraging the high levels of automated assurance to support automated building of the and automated deployment of the computer software, thus enabling releasing new code and new software in a very rapid manner whilst not severely negatively impacting the software quality.

The method may be used for Software-as-a-service (SaaS) providers, in which the patterns may be used to track the software behaviors while serving its customers. The method may be used to identify good, bad, or unknown behaviors through comparison to patterns generated upon the software runtime to the patterns identified while running the tests, before runtime.

The method may be used for software running on customer electronic devices, such as computers. The computer software provider may choose to provide pattern packages generated while running the software tests to the customer. The computer software provider may embed such comparison capability within the software application, thus enabling the customer to identify whether the application is behaving as expected or malfunctioning.

The patterns may be used to deterministically identify cyber-attacks on the software application by identifying unnormal behaviors or behaviors not observed during the testing of the computer software before its release.

The patterns may identify missing test cases due to a lack of matching between the patterns created during testing and the patterns observed during the software running, alerting the software provider of the need to add another test to validate the application quality and performance.

The subject matter described herein discloses a method, including performing tests for a computer software that emulate user or application behavior when using the computer software, the tests are performed by running the computer software on an electronic device according to the tests, detecting a first set of resource properties of resources of the electronic device when performing the tests on the computer software, creating multiple event records, each event record of the multiple event records represents a status of computer resources at a specific event that occurs when running the test on the computer software on the electronic device, identifying behavior patterns based on a series the event records created from the resource properties detected when running the tests, detecting a second set of properties of resources running the computer software following release of the computer software, comparing the behavior patterns extracted from the tests with a second behavior pattern of the computer software, the second behavior pattern is extracted from real-life operation after release of the computer software, detecting normal software behavior and unnormal software behavior based on the differences between the behavior patterns extracted from the tests and second behavior pattern.

In some cases, the computer resources include at least one of network consumption, memory status, processor status, hard drive, user interface, application interface status and a combination thereof.

In some cases, the status includes consumption of the computer resources during, before or after the test is running. In some cases, the status includes at least one of exceptions and failures of the computer resources during, before or after the test is running. In some cases, the method further including running a tracing software for collecting the status of the computer resources at the multiple events that occur when running the computer software on the electronic device.

In some cases, the multiple events include representation of normal user behavior, where the multiple event records comprise normal behavior parameters associated with normal user behavior. In some cases, the multiple events include representation of unnormal user behavior, where the multiple event records comprise unnormal behavior parameters associated with unnormal user behavior. In some cases, the multiple events include representation of normal user behavior and representation of unnormal user behavior, where the multiple event records comprise normal behavior parameters associated with normal user behavior and unnormal behavior parameters associated with unnormal user behavior.

In some cases, the multiple events are executed when performing the tests of the computer software include at least one of quality tests, performance tests, security tests, regression tests, unified test and a combination thereof. In some cases, the method further including outputting a log of normal behavior patterns and unnormal behavior patterns according to the set of event records. In some cases, the method further including removing specific metadata from the event records and from the second set of properties and comparing the behavior patterns extracted from the tests with the second behavior pattern of the computer software.

In some cases, identifying the behavior pattern includes transforming textual input of the resources' properties into numerical representation using text vectorization techniques. In some cases, performing at least some of the tests multiple times, further including generating multiple event records for the specific event based on multiple detections of resource properties, identifying the behavior pattern based on the multiple event records and comparing the behavior patterns based on the multiple times the test was performed with the second behavior pattern. In some cases, the method further including generating multiple vectors for representing multiple event records for the specific event and computing a distance between each vector and a vector representing the second set of properties of resources.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
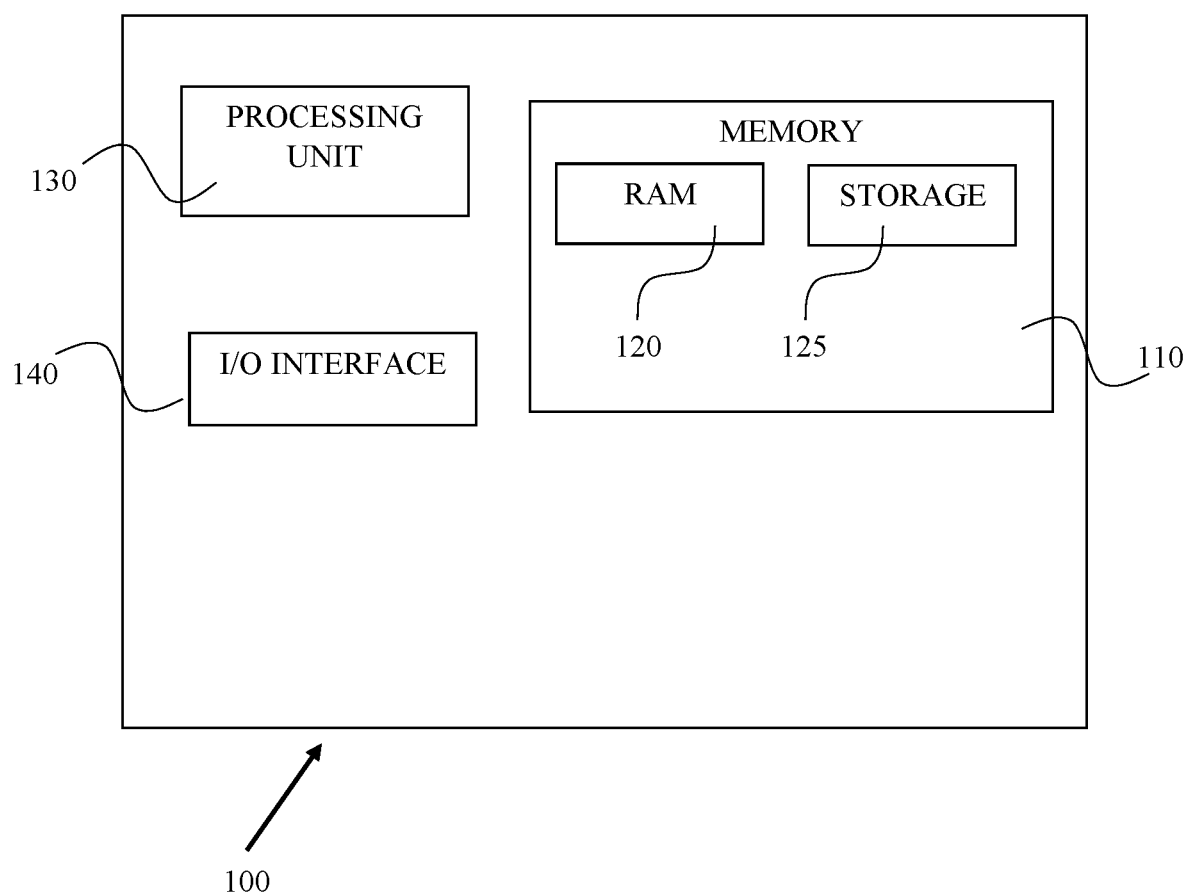
FIG. 1 is a schematic illustration of a computer device, according to exemplary embodiments of the subject matter.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

According to an aspect of the invention, there is provided a method for utilizing software tests for identifying normal software behavior when running the software after release.

The term "software", also disclosed below as "computer software", is defined as a set of operations running on an electronic device, such as a laptop, personal computer, a s sensor, a cellular phone, a server, a networking device and the like. The term includes any computer software language or platform desired by a person skilled in the art.

The term "release" may be defined as a stage in the life cycle of software development, in which the software is either deployed in the customers' devices, or is published to be used by customers, for example in case the software is used as a service. The tests defined in the context of the subject matter are performed before the production release, before the release goes to production.

The term "test" or "software tests" is defined as one or more operations performed by the software or on the software. The tests may include interaction of a user or another application interacting with the software. The test is designated to achieve a test objective, a test scenario, test steps and the like. Some test objectives may be to detect an expected or unexpected test result for the software test. The software tests may include automatic tests and manual tests. The output of the test may be a binary result of "failure" or "success", pertaining to the software achieving a predefined result. The output of the test may be a data file showing properties or behavior of computer resources during the test. Such resources may include network consumption, memory status, processor status, hard drive, user interface, application interface status and a combination thereof.

Referring now to the drawings, FIG. 1 is a schematic illustration of a computer device, according to exemplary embodiments of the subject matter.

Computer system/server 100 is shown as of a general-purpose computing device that when programmed is a special-purpose computing device. The components of computer system/server 100 may include, but are not limited to, one or more processors or processing units 130, a system memory 110, and a bus (not shown) that couples various system components including system memory 130 to processor 130.

Computer system/server 100 typically includes a variety of computer system readable media. Such media may be any available media that is accessible by computer system/server 100, and it includes both volatile and non-volatile media, removable and non-removable media.

System memory 110 can include computer system readable media in the form of volatile memory, such as random access memory (RAM) 120 and/or cache memory. Computer system/server 100 may further include other removable/non-removable, volatile/non-volatile computer system storage media. By way of example only, storage system 125 can be provided for reading from and writing to a non-removable, non-volatile magnetic media (not shown and typically called a "hard drive"). The memory 110 may include at least one program product having a set (e.g., at least one) of program modules that are configured to carry out the functions of various embodiments of the disclosure.

The memory 110 may store program modules, as well as an operating system, one or more application programs, other program modules, and program data. Each of the operating system, one or more application programs, other program modules, and program data or some combination thereof, may include an implementation of a networking environment. Computer system/server 100 may also comprise Input/Output (I/O) interfaces 140 enabling computer system/server 100 to communicate with one or more other computing devices.

Figure 2:
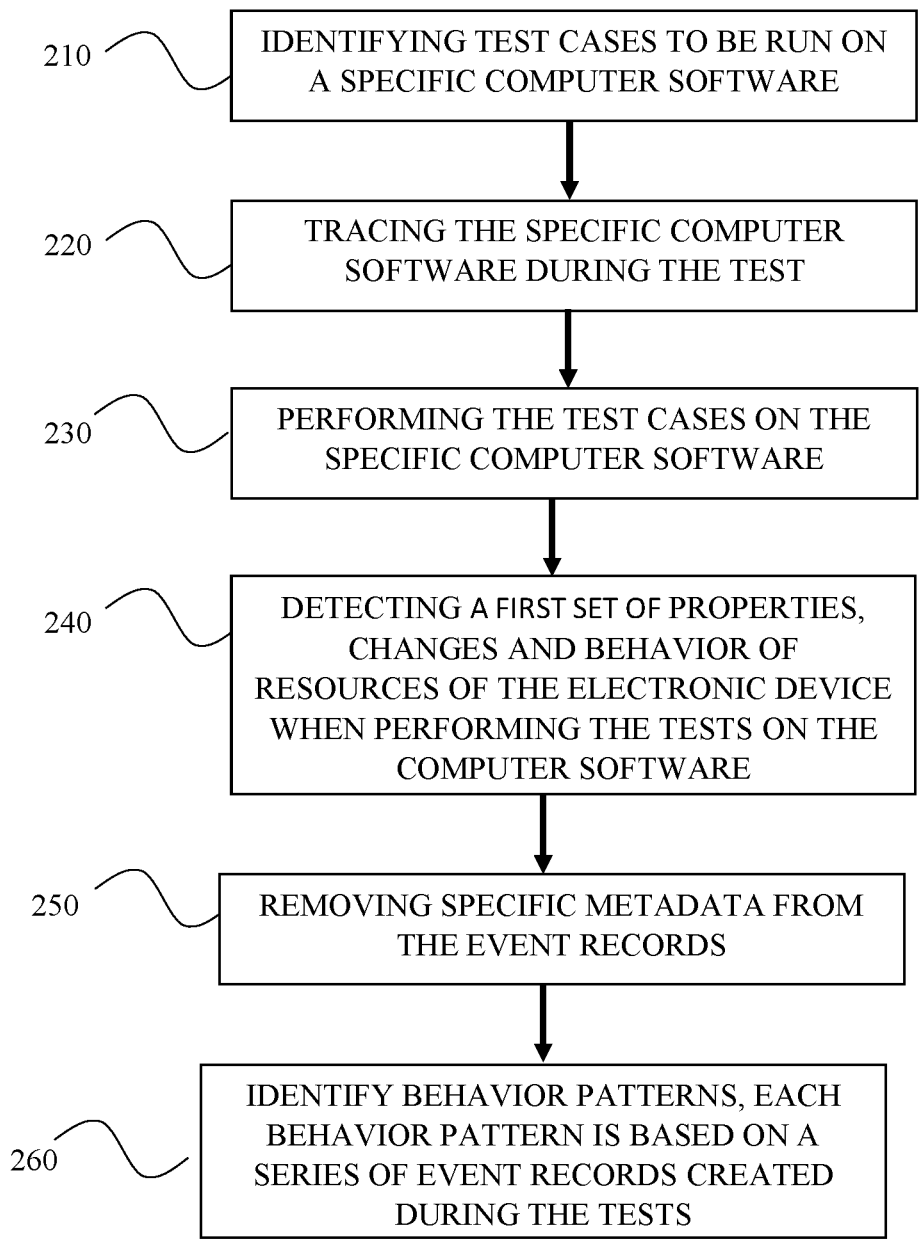
FIG. 2 is a schematic illustration of a method for extracting behavior patterns from a software test, according to exemplary embodiments of the subject matter.

FIG. 2 is a schematic illustration of a method for extracting behavior patterns from a software test, according to exemplary embodiments of the subject matter.

Step 210 discloses identifying test cases to be run on a specific computer software. The test cases may be associated with specific modules of the software, or with the entire flow or process implemented by the software. The number, manner, type and properties of the tests may be defined by a person skilled in the art. The tests may include one or more interactions with the software, the interactions are defined as content inputted into a memory address later accessed by the software in order to perform a process which is part of the software. The input may include one or more of an alphanumeric value, a data file, a link to a URL, an executable file used by the software to proceed, a cryptographic key, and the like.

Some of the tests may emulate user interaction, and some may emulate an application interacting with the software. The tests may include tests emulating normal behavior of the software. The tests may include tests emulating normal behavior of user or application interacting with the software. The tests may include tests emulating unnormal behavior of the software. The tests may include tests emulating unnormal behavior of user or application interacting with the software.

The tests may comprise a set of operations and values used to be inputted during at least some of the operations. The tests may comprise instructions, such as decision trees, in which the test changes based on the feedback from the software.

Step 220 discloses tracing the specific computer software during the test. Tracing may be performed using a tracing software installed on the electronic device in which the software runs during the test. The tracing software logs "low level" information (e.g., a thrown exception or values of memory consumption). The tracing software is distinguished from event logging, which logs "high level" information (e.g., failed installation of a program).

Software tracing techniques may include the following: tracing macros, Output to debugger, Aspect-oriented programming and related instrumentation techniques, Windows software trace preprocessor (aka WPP), FreeB SD and SmartOS tracing with DTrace—traces the kernel and the userland, Linux kernel tracing with ftrace, Linux system-level and user-level tracing with kernel markers and LTTng, Linux application tracing with UST—part of the same project as LTTng and Linux C/C++ application tracing with cwrap.

Step 230 discloses performing the test cases on the specific computer software. The tests are performed when the software is installed on an electronic device, such as a personal computer, laptop, cellular phone and the like. Some of the tests may be performed concurrently, for checking different properties of the software when performing a specific process. The tests may be associated with identifiers. The tests may be associated with a software component or process checked at a certain test. For example, tests #23-26 may be associated with user input when inputting a password, while tests #27-40 may be associated with various inputs from an application interacting with the software when wishing to perform a financial transaction.

Step 240 discloses detecting a first set of resource properties of resources of the electronic device when performing the tests on the computer software. The resource properties may then be stored in event records that represent events in the test, and how the resources performed during the event. The properties may include consumption of the resources, changes and behavior of the resources. Changes may be defined by difference in the resource behavior or properties over time. For example, the properties may include maximal consumption of the 120 kilobytes of the device's memory when performing the test, while during most of the test, the memory consumption is less than 2 kilobytes. The set of properties may include at least one of the resources. The set may be an array containing a status of the resources. The status may comprise resource consumption of multiple resources, such as network consumption, memory status, processor status, hard drive, user interface, application interface status and a combination thereof. Another property of the test may be the time duration required to perform a process included in the test, for example validating user input, writing into memory, reading from the device memory and the like. The properties may relate to a specific event during the test. For example, the test may execute several processes, such as uploading content from the device to a server, comparing user input to a database, displaying content on the device's display and the like. The set of properties may be associated with a specific event of the multiple events assembling the test.

Step 250 discloses removing specific metadata from the event records. The event records represent multiple sets of resources' properties, for example a set of properties detected at a specific time stamp. The removed metadata may comprise data specific to the electronic device in which the test is performed, or to the network used by the software to interact with the application. The specific metadata is removed from the event records to enable identifying the software's behavior pattern regardless to the specific device on which the software runs. For example, the test includes a user authentication process having multiple events. For example, one of the events in the test comprises an input coming from the IP address: 192.168.0.100. However, in real-life, after the software's release, the input may be provided from any IP address, and the IP address has no effect on the software's behavior. Hence, removing the specific metadata keeps the overall structure of the test. Example of a "redacted" event: "GET request for URI _____ from _____". This means that the URI (the hostname for the server) and the IP address might be different in production use cases.

Removal of specific metadata may include removing system hardware and software configuration such as the amount of memory consumed given the amount of memory on the system or how much memory is assigned to the application. For example, a software operating on a JAVA environment can assign 1024 mb of memory or 12 gb which will impact the time it takes to run a calculation as well as potentially how much memory the activity will take. This metadata may then be removed, as it does not change the way the software runs. The data that will remain in the event record includes, for example, a request issued from some IP, asking for the login page, invocation of a specific set of java functions in the application to render the webpage and the input and the like.

Step 260 discloses identifying a first set of behavior patterns, each behavior pattern is based on a series of event records created during the tests. The patterns may include one or more features, for example show increase or decrease in consumption of the resource. For example, the pattern may show slow increase in the memory consumption and a significant increase in the processor consumption during a process having 5 event records included in a test. The pattern may show an invocation of an application function or subset of code. For example, invocation of the authentication function for authentication activities. The pattern may show a network request to a specific open port and protocol. For example, a request to render a web page via HTTPS over port 443. The pattern may show data written to a file system. For example, file uploaded to the server by a user.

Identification of the behavior pattern may be performed using one or more methods including text vectorization, neural networks or locality-sensitive hashing (LSH) techniques to transform textual input to numerical representation. Each behavior pattern encompasses a series of numerical representations includes time-based, sequence-based or distance-based relationships between the numerical representations. The method of transforming the textual data to numerical representation enables accounting for ephemeral text representation or reduction of metadata insignificant for the behavior pattern detection, in example IP address, server name, file size, and reduction of the text in importance for the determination of match to the behavior pattern. For example, in an authentication scenario, multiple events may occur, including (1) device negotiates a secure network channel to interact with the software through transport layer encryption, (2) device asking for the authentication web page, (3) computer software generating and delivering an authentication webpage, (4) user inputs the data and submits the data to the computer software, (5) computer software conducts validations to authenticate the user, (6) if succeeded, the computer software generates an access token to be kept on the device and enable access to the computer software. In the abovementioned example, each event record includes multiple collected properties such as network changes, CPU changes and others. Text vectorization converts the textual properties (in example for negotiating secure network channel, the process may convert the following text: "TLSv1.2 Record Layer: Handshake Protocol: Client Hello") into numeric representation. Such numerical representations may be created for each property and subsequently for each event record. The utilization of time-series metadata enables the system to anticipate the needed series of events to describe a test case, and in runtime, identify the proximity of the observed test to the observed runtime behavior.

Figure 3:
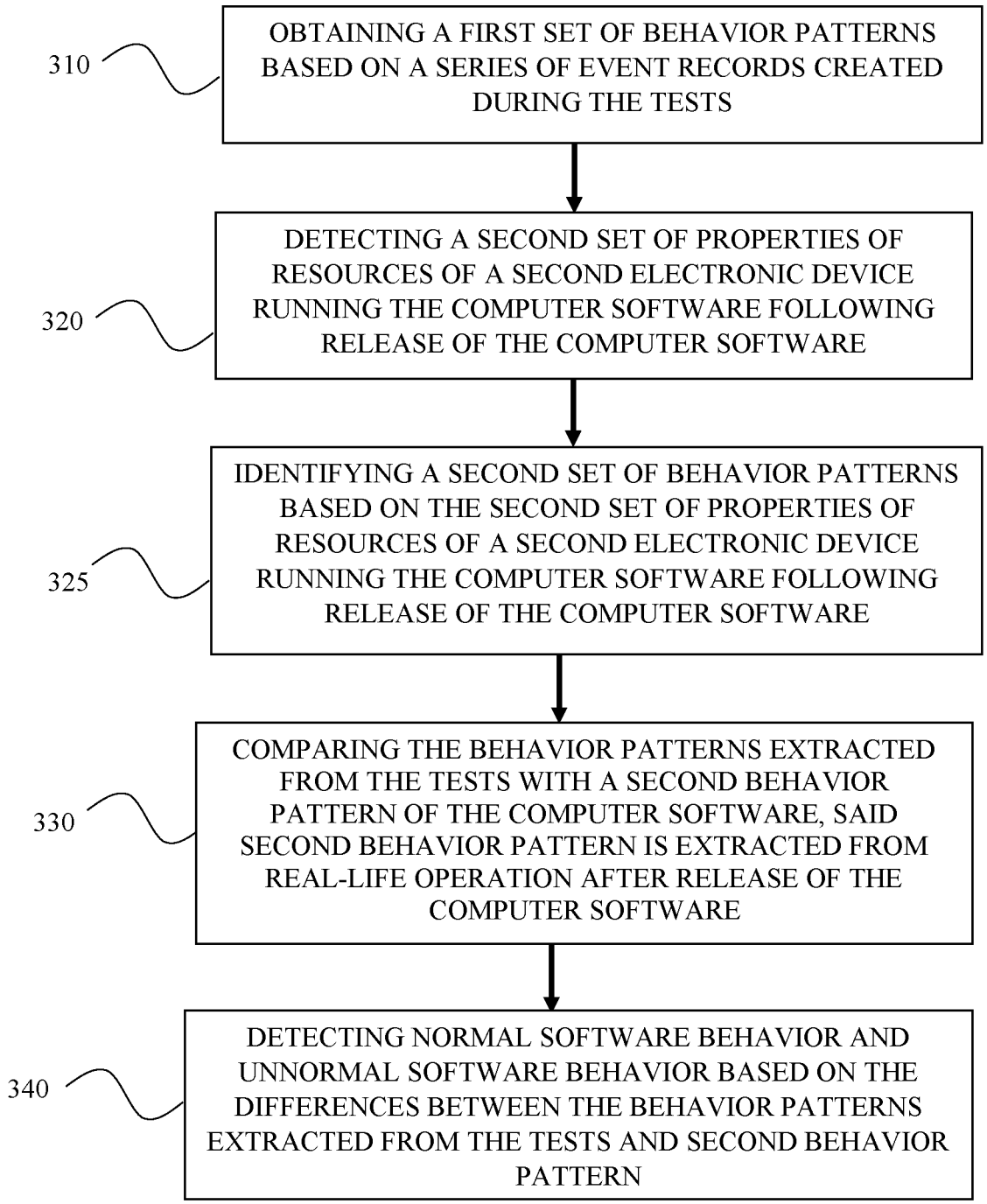
FIG. 3 is a schematic illustration of a method for extracting behavior patterns after release of the software, according to exemplary embodiments of the subject matter.

FIG. 3 is a schematic illustration of a method for extracting behavior patterns after release of the software, according to exemplary embodiments of the subject matter.

Step 310 discloses obtaining a first set of behavior patterns, each behavior pattern is based on a series of event records created during the tests. The set of behavior patterns relates to a specific software. The set of behavior patterns comprises changes of properties of resources of an electronic device when the software runs. The set of behavior patterns may be stored in a server used to check whether the software behaves normally or not, or in an electronic device on which the software is installed, such as a laptop, personal computer, cellular phone, tablet and the like.

Step 320 discloses detecting a second set of properties of resources of a second electronic device running the computer software following release of the computer software. The second set of properties is associated with the first set of properties as detected when performing the tests, prior to release of the software. The second set of properties comprises properties used or requested when performing a process by the software. The process performed by the software may have an identifier used to compare the properties, or the pattern, with the properties or behavior patterns detected and identified during the tests. For example, in case the first set of properties comprise properties detected in events #25-#32 during the tests, the second set of properties comprise properties detected in events #28-#30. The second set of properties may be stored in a server used to check whether the software behaves normally or not, or in an electronic device on which the software is installed, such as a laptop, personal computer, cellular phone, tablet and the like.

Step 325 discloses identifying a second set of behavior patterns based on the second set of properties of resources of a second electronic device running the computer software following release of the computer software. Creating the second set of behavior patterns may be performed using the same technique used to identify the first set of behavior patterns, or another technique, or a combination of techniques.

Step 330 discloses comparing the behavior patterns extracted from the tests with a second behavior pattern of the computer software, the second behavior pattern is extracted from real-life operation after release of the computer software. The comparison may be performed on a pattern by pattern basis, or a vectoral comparison, in which a vector comprises a behavior pattern during a specific event or process. The outcome of the comparison may be a value indicating a difference between the first set of behavior pattern and the second set of behavior patterns.

Step 340 discloses detecting normal software behavior and unnormal software behavior based on the differences between the behavior patterns extracted from the tests and second behavior pattern. In some exemplary cases, in case the difference between the patterns exceeds a threshold, the outcome of unnormal behavior. In some exemplary cases, the rules used to compare the sets of behavior patterns define that a difference in a specific resource property, or difference between behavior patterns higher than a threshold, indicate unnormal behavior, regardless to the total difference between the sets of behavior patterns.

In some exemplary cases, the method comprises running at least some of the tests multiple times. For example, one test can be performed 10 times and another test can be performed 200 times. This way, the resources' properties are detected multiple times, in order to detect a range of possible properties and behavior patterns. The multiple sets of resource properties associated with a single event executed multiple times during the test can be represented as a vector containing the properties. Then, when detecting the set of resources' properties after the software is released, in production, the method may determine normal behavior or unnormal behavior according to the minimal distance or the maximal distance of the vector created from the software runtime relative to the multiple vectors.

The terms "comprises", "comprising", "includes", "including", "has", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure. As used herein, the singular forms "a", "an" and "the" include plural references unless the context clearly dictates otherwise.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range. Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween. Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments unless the embodiment is inoperative without those elements. Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method, comprising:
    performing tests for a computer software that emulate user or application behavior when using the computer software, said tests are performed by running processes of the computer software on an electronic device according to the tests,
        wherein the processes performed by the computer software have an identifier, and
        wherein the tests are performed before release of the computer software;
    detecting a first set of resource properties of resources of the electronic device when performing the tests on the computer software;
    creating multiple event records, each event record of the multiple event records represents a status of computer resources at a specific event that occurs when running the test on the computer software on the electronic device;
    identifying behavior patterns based on a series of the event records created from the first set of resource properties detected when running the tests;
    detecting a second set of properties of resources when running the computer software following release of the computer software;
    creating a second set of event records, each event record of the second set of multiple event records represents a status of computer resources at a specific event that occurs when running the computer software following release of the computer software;
    identifying a second set of behavior patterns based on the second set of event records;
    comparing the behavior patterns extracted from the tests with the second behavior pattern of the computer software based on the identifiers of the processes performed during the tests and after release of the computer software, said second behavior pattern is extracted from the second set of properties of resources; and
    detecting normal software behavior and unnormal software behavior of the computer software based on the differences between the behavior patterns extracted from the tests and the second behavior pattern.

2. The method of claim 1, wherein the computer resources include at least one of network consumption, memory status, processor status, hard drive, user interface, application interface status and a combination thereof.

3. The method of claim 1, wherein the status comprises consumption of the computer resources during, before or after the said test is running.

4. The method of claim 1, wherein the status comprises at least one of exceptions and failures of the computer resources during, before or after the said test is running.

5. The method of claim 1, further comprising running a tracing software for collecting the status of the computer resources at the multiple events that occur when running the computer software on the electronic device.

6. The method of claim 1, wherein the multiple events include representation of normal user behavior, wherein the multiple event records comprise normal behavior parameters associated with normal user behavior.

7. The method of claim 1, wherein the multiple events include representation of unnormal user behavior, wherein the multiple event records comprise unnormal behavior parameters associated with unnormal user behavior.

8. The method of claim 1, wherein the multiple events include representation of normal user behavior and representation of unnormal user behavior, wherein the multiple event records comprise normal behavior parameters associated with normal user behavior and unnormal behavior parameters associated with unnormal user behavior.

9. The method of claim 1, wherein the multiple events are executed when performing the tests of the computer software include at least one of quality tests, performance tests, security tests, regression tests, unified test and a combination thereof.

10. The method of claim 1, further comprising outputting a log of normal behavior patterns and unnormal behavior patterns according to the set of event records.

11. The method of claim 1, further comprising removing specific metadata from the event records and from the second set of properties, comparing the behavior patterns extracted from the tests with the second behavior pattern of the computer software.

12. The method of claim 1, wherein identifying the behavior pattern comprises transforming textual input of the resources' properties into numerical representation using text vectorization techniques.

13. The method of claim 1, wherein performing at least some of the tests multiple times, further comprising generating multiple event records for the specific event based on multiple detections of resource properties;
    identifying the behavior pattern based on the multiple event records;

comparing the behavior patterns based on the multiple times the test was performed with the second behavior pattern.

14. The method of claim 13, further comprising generating multiple vectors for representing multiple event records for the specific event and computing a distance between each vector and a vector representing the second set of properties of resources.

\* \* \* \* \*